United States Patent [19]

Van de Mortel et al.

[11] Patent Number: 4,905,272

[45] Date of Patent: Feb. 27, 1990

[54] PABX CORDLESS TELEPHONE SYSTEM

[75] Inventors: Petrus P. Van de Mortel; Johannes C. F. Van Loon, both of Eindhoven, Netherlands

[73] Assignee: U.S. Philips Corporation, New York, N.Y.

[21] Appl. No.: 235,253

[22] Filed: Aug. 22, 1988

[30] Foreign Application Priority Data

Aug. 26, 1987 [GB] United Kingdom ............... 8720089

[51] Int. Cl.⁴ .............................................. H04Q 7/04
[52] U.S. Cl. ......................................... 379/62; 379/63
[58] Field of Search ............................. 379/62, 61, 63

[56] References Cited

U.S. PATENT DOCUMENTS

| | | | |
|---|---|---|---|
| 4,689,812 | 8/1987 | Hata | 379/62 |
| 4,700,375 | 10/1987 | Reed | 379/61 |
| 4,742,560 | 5/1988 | Arai | 455/33 |

FOREIGN PATENT DOCUMENTS 0196834  10/1986  European Pat. Off.

OTHER PUBLICATIONS

Communication from the European Patent Office in a corresponding application.

*Primary Examiner*—Robert Lev
*Attorney, Agent, or Firm*—Thomas A. Briody; Jack E. Haken; Anne E. Barschall

[57] ABSTRACT

A PABX cordless telephone system comprising a base station (10) and a plurality of handset (HS1 to HS5). The base station is connected to the public switching network and communicates with each handset by way of a respective duplex radio link. The operation of the PABX system is controlled by a micro-controller (16) in the base station. Micro-controllers are also present in each of the handsets. Security in the radio communication via the duplex radio links is provided by assigning an n-bit security address code, where n for example comprises 16 bits, to each handset. The signalling protocols in setting-up calls require the transmission of the full n-bit security code. In the interim periods the base station (10) carries out a security check on the handsets forming its system. Time, memory capacity in the micro-controllers and battery current can be saved while simultaneously achieving a high degree of security if the security check is carried out using m bits of the security codes where m<n and m is typically equal to 8.

14 Claims, 3 Drawing Sheets

PABX CORDLESS TELEPHONE SYSTEM

BACKGROUND OF THE INVENTION

The present invention relates to a PABX cordless telephone system and particularly to the security arrangements for such a system.

A typical domestic cordless telephone system comprises a base station which is connected to the public switching network and a handset which communicates with its associated base station by a duplex radio link. The handset includes a keypad so that the outgoing calls can be made via the radio link to the base station and then onwards through the public switching network. Conversely calls on the public switching network for a handset are relayed by the radio link from the base station which includes the necessary control circuitry. As the number of cordless telephone systems exceeds the number of radio channels which can be allocated then there is a risk of conflict between users. Perhaps the most serious conflict is third party who has a handset making an outgoing call via a first party's base station due to the fact that both parties have handsets which operate on the same radio channel.

This conflict and other conflicts are discussed in European Patent Specification No. 0 196 834 which also describes providing each cordless telephone system with a security arrangement whereby each base station/handset system has a multiple bit address and this address forms a part of the signalling protocol in setting up the radio link between the base station and the handset. This specification describes how the multiple bit address and the channel number can be changed automatically when the handset is placed in a cradle provided on the base station for the recharging of a rechargeable battery in the handset. This address and number changing is done by a pseudo-random number generator which is cycled so that each new number is stored successively in memories provided in both the base station and handset. Acknowledgement of the receipt of the data by the handset is done by echoing back the same data to the base station via the charge contact interface. When the battery is recharged then as part of the operation of removing the handset from the cradle in the base station, the most recent (security) address and channel number are maintained uncharged in both memories. Such an arrangement provides a high degree of security.

In a PABX system the situation is different from a domestic system in that the base station has to be able to communicate via respective radio channels with a plurality of handsets. Within the system one wants each handset to be able to make and receive calls by way of the public switching network as well as to have intercom calls from one handset to another by way of the base station. In consequence part of the control function of the base station is to check continuously which channels and handsets are free. Additionally as part of the security arrangement, a multiple bit address, say a 16 bit address, of each handset in the PABX system can be altered in the manner described in European Patent Specification No. 0 196 834 when placed in respective battery charging sockets. A memory in each handset stores its respective address and channel. However a memory in the base station has to be store the latest number of each handset and the channel allocated. One method of avoiding conflicts between the handsets on neighbouring PABX systems would be to address each handset in turn and obtain an appropriate acknowledgement, for example busy or free. A typical signalling rate is 115 bits/second and assuming that there are 10 handsets and the signalling protocol comprised a 25-bit code then including allowing time, say 20 ms, for an acknowledgement from each handset, a minimum of 3.2 seconds would be required to execute one sequence, which is unacceptable.

SUMMARY OF THE INVENTION

An object of the present invention is to be able to execute a security check in a cordless telephone PABX system quicker whilst maintaining a high degree of security.

According to one aspect of the present invention there is provided a PABX cordless telephone system comprising a base station and a plurality of handsets, the base station and the handsets each having a transceiver for communication to and from each other by way of a respective duplex radio link, the base station having a micro-controller for controlling the system and each handset having a micro-controller for controlling various functions is the handset, the micro-controller in the handset including a memory in which is stored an n-bit security address code which is used in cell set-up protocol with the base station and the micro-controller in the base station including a memory for storing all the assigned security address codes, wherein the micro-controller in the base station is programmed to carry-out security checks on its associated handsets by using m-bits of the n-bit security address code where $m<n$.

According to another aspect of the present invention a method of operating a PABX cordless telephone system comprising a base station and a plurality of handsets, each handset having an n-bit security address code which is also stored in the base station, wherein during call set-up protocols the full n-bit security codes are used in duplex radio links between the base station and the handsets and wherein the base station makes security checks on the handsets using m bits of the n-bit security code address, where $m<n$.

In an embodiment of the present invention the in least significant bits of each security address code are used. Typically $n=16$ bits and $m=8$ bits. By using m bits of each security address code during the security checking operation several benefits are obtained including using less memory capacity in the base station's micro controller, enabling the security check to be completed more quickly compared to sending all n-bits each time, and saving battery current in the handsets because at the receiver is only required to be powered-up for a shorter time.

BRIEF DESCRIPTION OF THE DRAWING

The present invention will now be described, by way of example, with reference to the accompanying drawings, wherein.

In the drawings corresponding reference numerals have been used to indicate the same features.

DETAILED DESCRIPTION OF THE PREFERRED EMBODIMENTS

Figure 1:
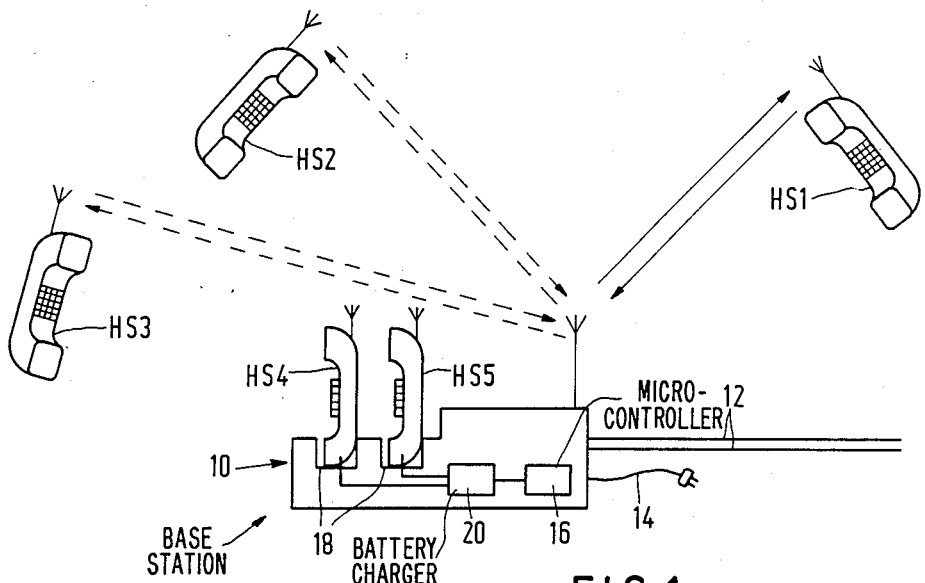
FIG. 1 illustrates diagrammatically a PABX system comprising a base station and five handsets.

The PABX system illustrated in FIG. 1 comprises a base station 10 which is connected to the public switching network by lines 12 and to the mains power supply by way of a cable 14. The system further comprises five handsets HS1 to HS5. Each handset HS1 to HS5 is able to communicate with the base station by way of a respective duplex radio link. The base station 10 contains transceivers in the handsets HS1 to HS5. Control of the communications is by a micro controller 16 in the base unit 10. Under its control the handset HS1 is for example connected to the public switching network whilst an intercom call is established between the handsets HS2 and HS3. Because of the limited number of radio channels available for cordless telephone systems and also because of the relatively close proximity of neighbouring PABX systems having to use the same channels then each handset has its own multiple bit security address code, say a 16 bit binary address code which comprises a pseudo-random number. This number can be readily changed. When recharging the battery in the handsets, for example the handsets HS4 and HS5. Recharging is carried out by placing the handset in a socket 18 in the base station 10. Each socket 18 has an electrical connection to a battery charger 20 in the base station 10. The micro-controller 16 includes a pseudo-random number code generator which changes the security address of the or each handset by pulsing the charging current. In order to render the system suitable for a plurality of handsets, a stop facility is provided on the code generator so that the code does not change whenever the handset is replaced in the course programming and operating the handsets in the system. If desired an identification number in each handset of the system may be programmed by means of a keyboard (not shown) in the base station 10.

Figure 2:
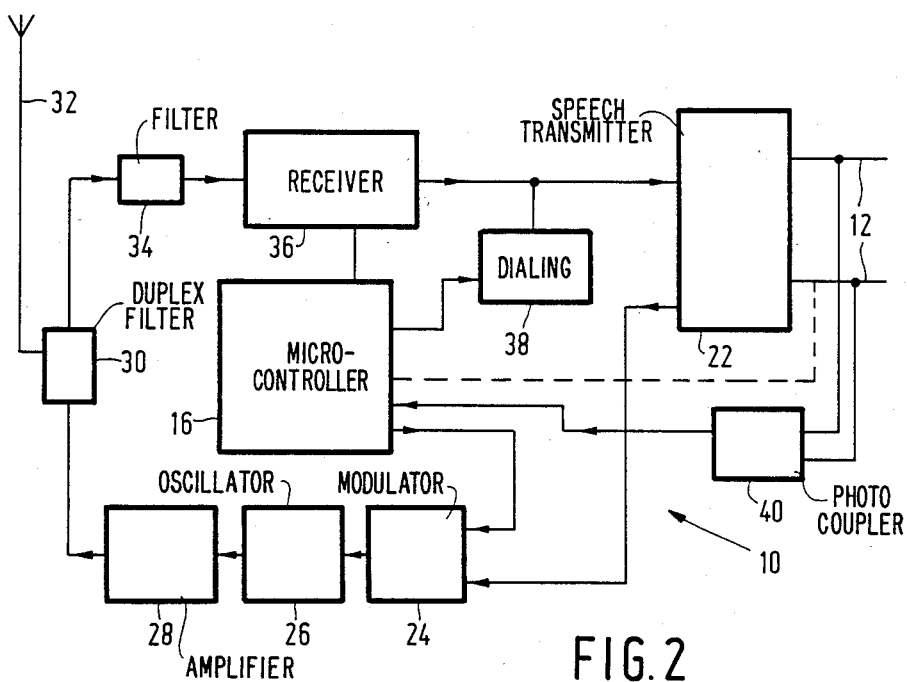
FIG. 2 is a block schematic diagram of a base station.

FIG. 2 illustrates the basic features of the base station 10 for establishing speech communications. Incoming speech on the public switching network lines 12 is applied to a speech transmitter 22 which is connected to a modulator 24. The speech is modulated on a carrier frequency produced by an oscillator 26 and the modulated output is amplified in an R.F. power amplifier 28. The amplified output is applied to a duplex filter 30 which is coupled to an antenna 32. Incoming speech from a handset is detected by the antenna 32 and is passed via the duplex filter 30 to another filter 34. The filtered signal is applied to a receiver 36 from which the detected speech is applied to the speech transmitter 22 and thence onto the lines 12.

In the case of an intercom call the output of the speech transmitter 22 is connected the modulator 24 for transmission onwards to the transceiver of the other handset. The control of the base station 10 is by the micro controller 16.

When a call from a handset is to be transmitted on the public switching network then the dialling of the number to be called is effected by a dialling circuit 38 under the control of the micro controller 16. If desired dialling may be done by DTMF (dual tone multiple frequency).

Additional control information is derived from the lines 12 by a photo-coupler 40 and is relayed to the micro controller 16.

Figure 3:
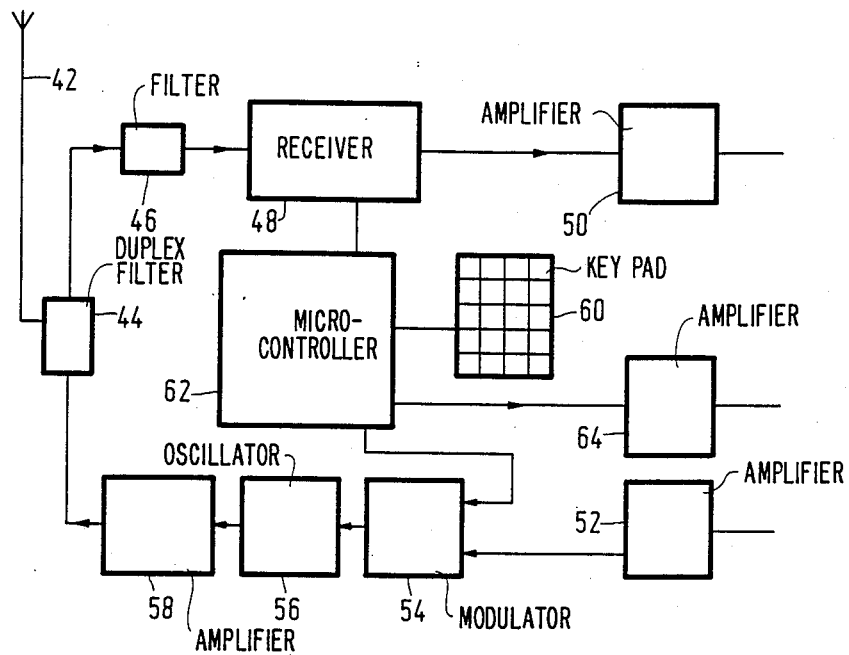
FIG. 3 is a block schematic diagram of a handset.

The handset shown in FIG. 3 comprises an antenna 42 which is connected to a duplex filter 44.

In the case of an incoming signal, it is filtered in another filter 46 before being applied to a receiver 48, the output of which is applied to an amplifier 50.

An outgoing signal to a base station is amplified in an amplifier 52 before being applied to a transmitter section formed by a modulator 54, an oscillator 56 and R.F. power amplifier 58.

A keypad 60 is connected to a micro-controller 62 which has outputs connected to the receiver 48, modulator 54 and another amplifier 64.

The base station 10 and the handsets can be made from known designs in the case of the transmitter section 24 to 28 (FIG. 2) or 54 to 58 (FIG. 3) and from standard integrated circuits such as the MC3361 in the case of the receiver, the choice being related to the frequency of operation for example on or about 900 MHz or in the 46 to 49 MHz band.

The micro-controllers 16 and 62 are of the same type such as PCD 3315/5xx operating on a time base of 3.58 MHz. The amplifiers 50, 52 and 64 can be of a type TDA 7050, the speech transmitter 22 (FIG. 2) can be of a type TEA 1060 and the dialling circuit 38 may comprise a DTMF dialler type PCD 3312.

Figure 4:
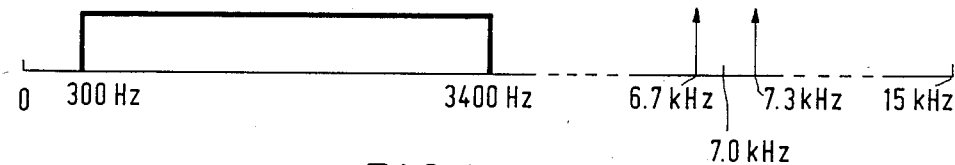
FIG. 4 is a frequency diagram of a channel.

Referring to FIG. 4, a channel in the 46 to 49 MHz band comprises 15 KHz. The speech signal comprises a band between 300 Hz and 3400 Hz and control information is sent as frequency shift keyed signal centred on a pilot frequency of 7.0 kHz, say a "1" being 6.7 kHz and a "0" 7.3 kHz.

In view of the fact that the present invention is primarily concerned with security details of the various switching sequences and protocols will not be given in the interests of brevity.

In order to safeguard the PABX system from unauthorised users, when an incoming call is being received the security code of the handset to receive the call, which code is stored in a memory in the micro-controller 16 of the base station 10, is transmitted and is received by the handset (strictly speaking by all the handsets operating on that channel and receiving the transmitted signal. The handset (or handsets) compares the received security code with the security code stored in a memory associated with the micro-controller 62 (FIG. 3). If the code is confirmed the duplex channel will be enabled for the telephone conversation between the addressed handset and the base station.

When an outgoing call is to be made by the handset, then the handset initially transmits its security code which is followed by the number to be called. At the base station a comparison is made of the received security code with that stored for the particular handset, and, if confirmed then the selection information is passed on.

As mentioned earlier, the security code store in a handset is changed each time its battery is recharged. More particularly the security codes are transmitted in a suitable code such as the "Manchester" code in which after each bit the complement is transferred. Irrespective of which coding is used it is necessary for the micro-controller 62 in the handset to be synchronised with the micro-controller 16 in the base station during the time when the security code is being sent. The micro-controller 62 is able to detect when the 16 bits of the security code have been transmitted. Thereafter the micro-controller 62 activates the transmitter section of the handset and the security code is sent back to the base station micro-controller 16 via a radio link.

The old security code will be overwritten by the new security code once the transmitted and received code words are equal. Until that time the old code remains valid. Thus picking-up the handset during code transformation will have no consequence for the user because last written security code remains valid.

If the received code is not correct, the procedure will be repeated as long as the returned code is not equal to the code as transmitted by the base station. This technique is useful to confirm that the battery in the handset is recharged at least to an arbitrary minimum extent because there must be enough power in it to retransmit the security code back to the base station via the radio link. Cycling of successive security codes can take place every 9.4 ms.

Once a handset has been removed from a socket 18 (FIG. 1) and is switched-on, security codes are transmitted to the base station 10. The received codes are checked by the micro-controller 16 in the base station 10 and if equal, the base station transmitter is switched on and will send an acknowledgement signal. In order to allow time for checking the security code and switching-on of the transmitter oscillator 26 (FIG. 2), a wait time of 20 ms is built-in before the acknowledgement is sent-out.

Figure 5:
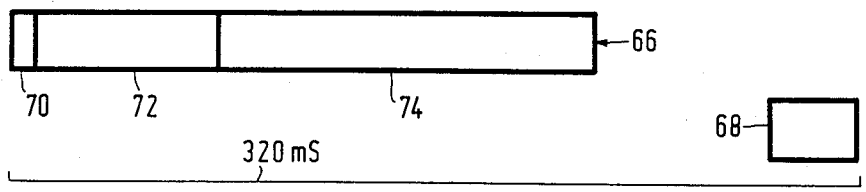
FIG. 5 illustrates the protocol of a security transmission.

FIG. 5 illustrates a 25-bit code word 66 which is transmitted by the handset when it is switched on and a 4-bit acknowledgement signal 68 transmitted by the base station. The code word 66 comprises a synchrononisation bit 70, eight bits 72 of information and a 16 bit security word 74. This code word 66 is sent out by the handset at a speed of 115 bits/second. The handset waits for 64 ms and if an acklowledgement has not been received in the meantime then it repeats the sending of the code word 55 providing the handset is still on and an acknowledgement has been received. The acknowledgement signal comprises an instruction that dialling data is to be sent.

The dialling data has been formulated in accordance with a byte-oriented format to ensure the correct functioning of the entire system. The byte-oriented format comprises (1) a first half byte,
(2) a second half byte, and
(3) subsequent bytes.

Figure 6:
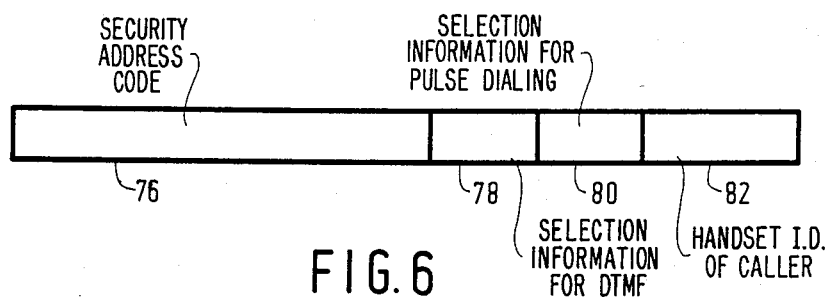
FIG. 6 illustrates a code word used in the system protocol.

FIG. 6 illustrates a first code word transmitted by a handset to a base station. This code word is constituted by four parts. The first part comprises the 16-bit security address code 76, the second part 78 comprises selection information for DTMF selection, if this form of dialling is available for use, the third part 80 comprises selection information for pulse dialling selection, if this form of dialling is available for use, and the fourth part 82 is the handset identification number of the calling party. For the purpose of synchronisation it is necessary for the first transmitted code word to be preceded by some synchronising pulses.

In the second code word the relevant dialling information is sent, for example the trunk-dialling code and the called party's number. In order to obviate the imperfections of the radio channel, redundancy has been used for transmission via the radio channel.

The receipt of these code words by the base station is acknowledged.

When the base station receives a call for one of its handsets, it transmits a code word comprising the 16 bit security code of the handset and, if applicable, the identification number of the handset. The identification number is necessary in those cases, there are two or more handsets forming extensions and each is allocated the same security number. The addressed handset acknowledges the receipt of the code word and at the same time causes its microphone amplifier and audio amplifier to be energized.

Figure 7:
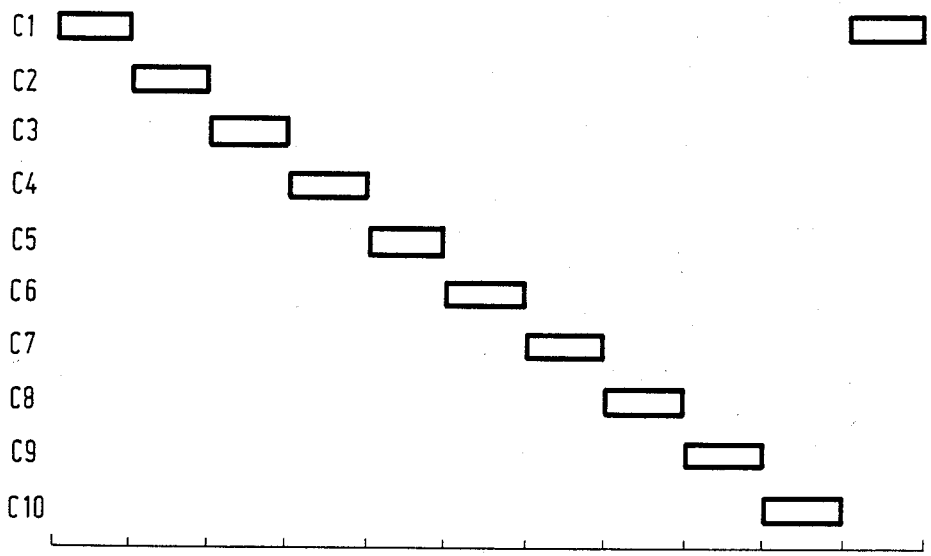
FIG. 7 illustrates the sequence of carrying out a security check using m out of n (where n>m) bits of the multiple bit security address.

In a PABX system employing cordless telephones it is desirable for the base station to monitor the status of each the handsets, that is for example whether it is on standby, participating in a call involving the public switching network, or involved in an intercom call. In order to do this check the micro-controller interrogates each handset in turn using the control part of each channel, that is the FSK signalling centred on 7.0 kHz. In order to economise on the time taken in making the check bearing in mind the signalling rate of 115 bits per second and the desire to maintain a high degree of security the micro-controller 16 scans the channels sequentially by transmitting m of the n (where n>m) bits of the security code. This is illustrated in FIG. 7 of the drawings which assumes that the PABX has ten channels C1 to C10. In the case of a 16 bit security code, m=8. The 8 bits may be the least significant bits of the code, the most significant bits or bits selected from a part intermediate the least and most significant bits. Security scanning using m out of n bits has an advantage over using the entire n bits because less buffer memory capacity has to be reserved in the base station micro-controller 16 and the memory capacity saved in this way is available for use in other operations by the micro-controller 16. A further saving in time and memory capacity can be achieved by not carrying out a security check on those channels occupied by an intercom call. In any event the security check which it is desirable to make every one or two seconds can be completed in less than one second, more particularly in 80/115 seconds.

Battery current in the handsets is also saved by this measure because in the standby mode the receiver in each handset need only be switched-on for approximately half the time that a receiver has to be if n bits of security code are transmitted.

The handsets respond to the security check byte sending the same m bits as were transmitted by the base station together with an indication of their statuses. Once the response has been sent the transmitters in the handsets are switched-off.

In the event of a handset wishing to make a call or the base station receiving a call for a handset during the security check then the call set-up between the base station and the handset is delayed until the security check is completed. As the delay is less than one second than this is within the specification of many nationally approved telephone systems.

What is claimed is:

1. A PABX cordless telephone system comprising a base station and a plurality of disconnectable handsets, the base station and the handsets each having a respective transceiver for communication to and from each other by way of a respective duplex radio link, the base station having a micro-controller for controlling the system, and each handset having a respective micro-controller for controlling various functions in the handset, each respective micro-controller in the handsets including a respective memory for storing a respective n-bit security address code which is used in call set-up protocol with the base station and the micro-controller in the base station including a memory for storing all the respective security address codes, wherein the micro-controller in the base station is programmed to carry out security checks on the handsets by using m bits of the respective security address codes where $m<n$.

2. A system as claimed in claim 1, wherein the security check is made using the m-least significant bits of each security address code.

3. A system as claimed in claim 1, wherein $n=16$ and $m=8$.

4. A system as claimed in claim 1, wherein
(a) each handset has a rechargeable battery,
(b) the base station has means for recharging the battery in place in each handset, the recharging means including battery charger contacts,
(c) the micro-controller in the base station includes a pseudo-random counter which is electrically coupled via the battery charger contacts and the rechargeable battery to the micro-controller in the handset so that the security address code of the handset is changed to a new security address code during recharging,
(d) the micro-controller in the handset causes its transceiver to transmit the new security address code via the duplex radio link to the base station,
(e) the micro-controller in the base station has means for comparing a received security code with the new security address code and if they are equal for instructing the security address code stored in the memories of the micro-controllers of the base station and the relevant handset to be overwritten by the new security address code.

5. A system as claimed in claim 1, wherein the security check by the base station micro-controller is effected by scanning its associated handsets in sequence.

6. A method of operating a PABX cordless telephone system comprising a base station and a plurality of handsets, each handset having an n-bit security address code which is also stored in the base station, wherein during call set-up protocols the full n-bit security codes are used in duplex radio links between the base station and the handsets and wherein the base station makes security checks on the handsets using m bits of the n-bit security code address, where $m<n$.

7. A method as claimed in claim 6, wherein the duplex radio links are scanned sequentially by the base station.

8. A method for operating a PABX cordless telephone system which includes a base station and a plurality of disconnectable handsets, each respective handset having a respective n-bit security address code which is stored in both the base station and in the respective handset, comprising the steps of:
a. transmitting the full n-bit security address codes in duplex radio links to and from the base station and the handsets, during call set-up protocols; and
b. making security checks of the handsets, in the base station, using m bits of the n-bit security address codes, where $m<n$.

9. A method as claimed in claim 6, wherein $n=16$ and $m=8$.

10. A system as claimed in claim 2, wherein $n=16$ and $m=8$.

11. A method as claimed in claim 8 comprising the step of carrying out signalling associated with the security checks in a first part of a channel frequency band above a second part of the channel frequency band, which second part is used for speech.

12. The method of claim 8 wherein the making step comprises using the m least significant bits of the security code addresses.

13. The method of claim 8 wherein the making step comprises signalling in a part of the channel frequency band above that used for speech.

14. The method of claim 8 further comprising the step of scanning the respective duplex radio links sequentially, said scanning step being performed by the base station and including one said transmitting step and one said making step for each respective duplex radio link.

* * * * *